United States Patent [19]

Sargeant

[11] 4,148,467
[45] Apr. 10, 1979

[54] PIPE CUTTING AND WELDING APPARATUS

[76] Inventor: Eugene F. Sargeant, Box 367, Rogers, Ark. 72756

[21] Appl. No.: 859,480

[22] Filed: Dec. 12, 1977

[51] Int. Cl.² .............................................. B23K 7/04
[52] U.S. Cl. ...................................... 266/57; 266/61; 266/68
[58] Field of Search ................... 33/21 C; 266/54, 56, 266/57, 61, 67, 68, 71, 62, 77

[56] References Cited

U.S. PATENT DOCUMENTS

| 2,035,765 | 3/1936 | Schmidt | 266/77 X |
| 2,408,517 | 10/1946 | Howard | 266/58 X |

Primary Examiner—Roy Lake
Assistant Examiner—Paul A. Bell
Attorney, Agent, or Firm—Bacon & Thomas

[57] ABSTRACT

A pipe having a guide pattern or template mounted on and surrounding it is rotatable about its longitudinal axis while a pattern follower actuates a cutting or welding tool to move longitudinally as the pipe rotates. The follower and tool are carried by a frame supported on the pipe by rollers. The frame is mounted on a support for universal tilting and for horizontal sliding in one direction to ensure that the follower and tool bear a constant relationship to the pipe irrespective of any undulations or out-of-round features of the pipe.

9 Claims, 3 Drawing Figures

PIPE CUTTING AND WELDING APPARATUS

BACKGROUND OF THE INVENTION

This invention relates to machines for guiding cutting or welding torches relative to a pipe.

It is often necessary to cut pipe for joining to another pipe either coaxially arranged therewith or extending at an angle. It has been generally customary for the mechanic to lay out the outline of the cut on the pipe sections, then to cut the pipe by guiding a cutting torch in a freehand manner. Such procedure, however, does not provide the accuracy necessary for a reliable joint and it is usually necessary to further grind or otherwise alter the cut edge to provide an accurate fit before the pipe sections are welded together.

It has also been proposed to provide apparatus for mechanically guiding a cutting or welding torch relative to a pipe in accordance with a pattern or templet carried by the pipe. However, such devices have not been designed to take into account the possibility of inaccuracies in the pipe such as slight bends or undulations or an oval rather than circular cross section. Thus, when the pipe is rotated relative to the tool guiding mechanism inaccuracies are introduced due to the bends in the pipe or its out-of-round section and in some cases where the axis of rotation is not precisely stationary. As examples of such prior art devices, see patents numbered U.S. Pat. No. 2,408,517; 2,459,823; and 3,790,144.

SUMMARY OF THE INVENTION

The present invention comprises generally a means for guiding a cutting or welding torch relative to a pipe that is mounted for rotation about its longitudinal axis. The pipe carries a templet or pattern on its outer circumference which is engaged by a follower member movable axially of the pipe. The follower member is rigidly connected to the cutting or welding tool so that the latter follows all movements of the follower, axially of the pipe, as the pipe rotates. The major improvement of the present invention resides in mounting the guiding means for the follower-cutting tool on a framework that is capable of universal movement. That is, it is capable of tilting in a plane containing the pipe axis, of turning about an axis perpendicular to the pipe axis and for linear lateral movement over the pipe in addition to pivotal movement vertically to approach or recede from the pipe axis in a radial direction. Thus, the follower and tool assembly can always assume a position precisely parallel to the pipe axis at that time and at a predetermined and constant distance from the surface of the pipe.

DESCRIPTION OF A PREFERRED EMBODIMENT

Figure 1:
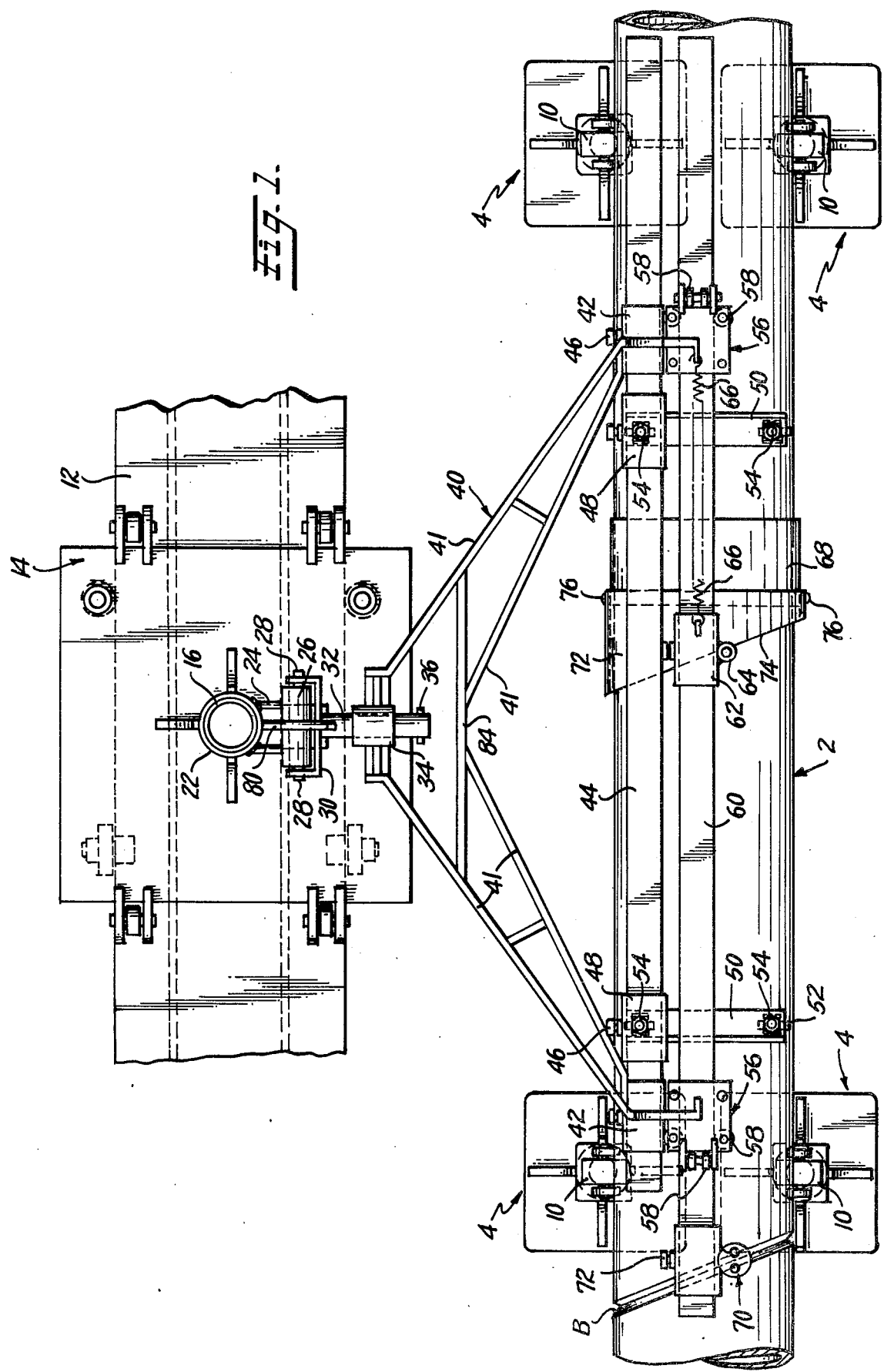
FIG. 1 is a plan view of an apparatus embodying the present invention with one form of template on the pipe.

In the drawings, numeral 2 designates a pipe section to be processed such as by cutting or welding to another pipe section and shown as being supported for rotation about its longitudinal axis by adjustable support means 4. As shown, the support means comprise standards 6 capable of being laterally adjusted relative to each other, by slotted plates 3 and bolts 5, to accommodate pipes of different size and each standard 6 carries a vertically adjustable post 8 with clamp members 9 and having a pipe supporting roller 10 thereon. Such pipe supporting means are not an essential part of the present invention, any other suitable means for supporting the pipe for rotation may be employed. Also, it is contemplated that suitable means (not shown) be provided for rotating the pipe 2 about its longitudinal axis.

Adjacent the pipe 2 and laterally displaced therefrom is a trackway 12 upon which a support carriage 14 is mounted for longitudinal movement. The carriage 14 likewise constitutes no part of the present invention but is guided along and held on the trackway 12 by suitable rollers, as illustrated.

Upstanding from the carriage 14 is a post 16 upon which a clamp bushing 18 is engaged. The bushing 18 may be of the split collar type and include a clamping means 20 for securing it in a selected position of vertical adjustment. The bushing 18 is provided with a planar upper surface upon which a sleeve 22 is rotationally supported. The sleeve 22 is freely rotatable about the post 16 at the elevation determined by collar 18 and is provided with a bracket 24 (see FIG. 1) on which a bushing 26 is formed to define an axis transverse to the vertical axis of the post 16. The bushing 26 includes stub shafts 28 on which a yoke 30 is freely pivoted. The yoke 30 is provided with a generally horizontally extending spindle or axle 32 extending generally toward the pipe 2 but above the same.

Journalled on and freely slidable along the spindle 32 is a further sleeve 34 retained on the spindle 32 by a transverse stop pin 36.

A relatively lightweight but rigid framework 40 is fixed to the sleeve 34 and extends generally laterally of the post 16 to a position where its outer end is over the pipe 2. The framework 40 is preferably of generally A-shape, as best seen in FIG. 1, and fabricated as a truss-like assembly of elongated members 41. Fixed to axially spaced end portions of the frame 40 are box-like bushings 42 through which a beam member 44 extends. The beam member 44 is longitudinally adjustable through the bushings 42 and may be retained in any selected position of axial adjustment by suitable set screws or the like 46. A pair of slide bushings 48 is mounted on the beam 44 for longitudinal adjustment thereon and each includes a laterally extending bracket 50 extending over and transverse to the pipe 2. Pipe engaging rollers 52 are carried by the brackets 50 for adjustment toward and from each other by means of the illustrated slots and clamping nuts 54. Thus, the rollers may be adjusted toward or from each other to position the brackets 50 a predetermined distance above the upper surface of pipes 2 of widely different diameters. Also, the brackets 50 may be adjusted axially relative to each other and to frame 40 by means of the slide bushings 48 and the capability of sliding beam 44 axially of the pipe. It is to be noted that a wide range of adjustments is possible since the bushings 48 may be either between bushings 42 or outwardly thereof.

Also carried by frame 40 adjacent the box bushings 42 are roller guide assemblies 56. The guide assemblies 56 rotatably support lateral and vertical series of ball bearings 58 arranged to guidingly support a tool bar 60 shown as being of rectangular sectional pipe whereby it is freely movable axially of the pipe through the roller guides 56 but incapable of rotation about its longitudinal axis. The tool bar 60 carries a follower support 62 which in turn may be made adjustable along the tool support and which carries a depending templet follower rod 64 extending downwardly to a template engaging end closely adjacent the surface of pipe 2. A tension spring 66 extends between the follower support 62 and one end of the frame 40 to normally urge the tool bar 60 to the right, as seen in FIG. 2 and thus yieldably hold follower rod 64 against a template.

Figure 2:
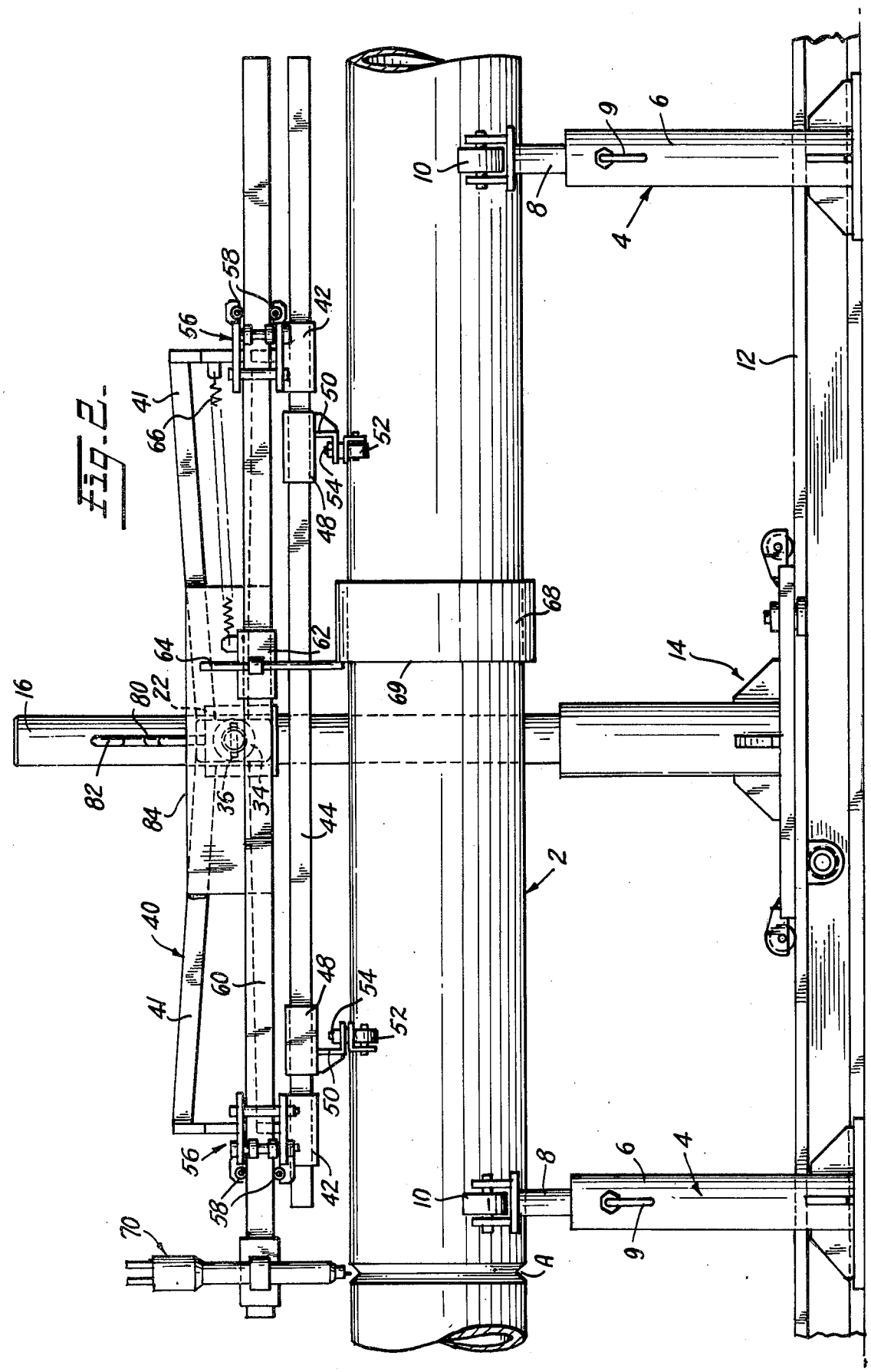
FIG. 2 is an elevational view of the apparatus of FIG. 1 as seen from the bottom of FIG. 1 but with a different guiding template controlling the follower.

In FIG. 2, a cylindrical templet or collar 68 is shown surrounding the pipe 2 and having a guiding edge 69 lying in a plane perpendicular to the axis of pipe 2. The collar 68 may be secured to the pipe 2 in any suitable manner but must be removable therefrom and capable of being fixed to the pipe for rotation therewith. At the outer or left hand end of tool support 60, as seen in FIG. 2, a suitable tool 70 is mounted. The tool 70 may be any tool such as a flame cutter or welding torch. The tool 70 is fixedly carried by tool support 60 for adjustment therealong but is capable of being fixed in a desired position by suitable clamping means 72. It will be obvious from the description thus far that rotation of the pipe 2 as seen in FIG. 2 will cause the tool 70 to either cut or weld the pipe 2 along a plane corresponding exactly to the edge 69 but displaced therefrom to the position A of FIG. 2.

Referring to FIG. 1, the templet support 68 is shown as having fixed thereon, by suitable fasteners 76, a pattern or templet member 72 having a guiding edge 74 defining a plane oblique to the axis of the pipe 2. As will be obvious, rotation of the pipe of FIG. 1 will cause the tool 70 to follow the oblique path indicated generally at B in FIG. 1. Obviously, any other desired shape or angle of the edge 74 may be provided.

From the foregoing description it will be apparent that the supporting rollers 52, there being four of them, can always engage the surface of the pipe 2 irrespective of any bends or curvatures in the pipe and irrespective of any inaccuracies in the shape of the outer periphery thereof. It will also be apparent from the structure described that the frame 40, where it overlies pipe 2, is capable of universal tilting movement about vertical and horizontal axes and can freely follow all undulations of the pipe 2 as it rotates and thus ensure that the tool 70 will precisely follow the contour of the templet guiding edge as related to the pipe itself.

Figure 3:
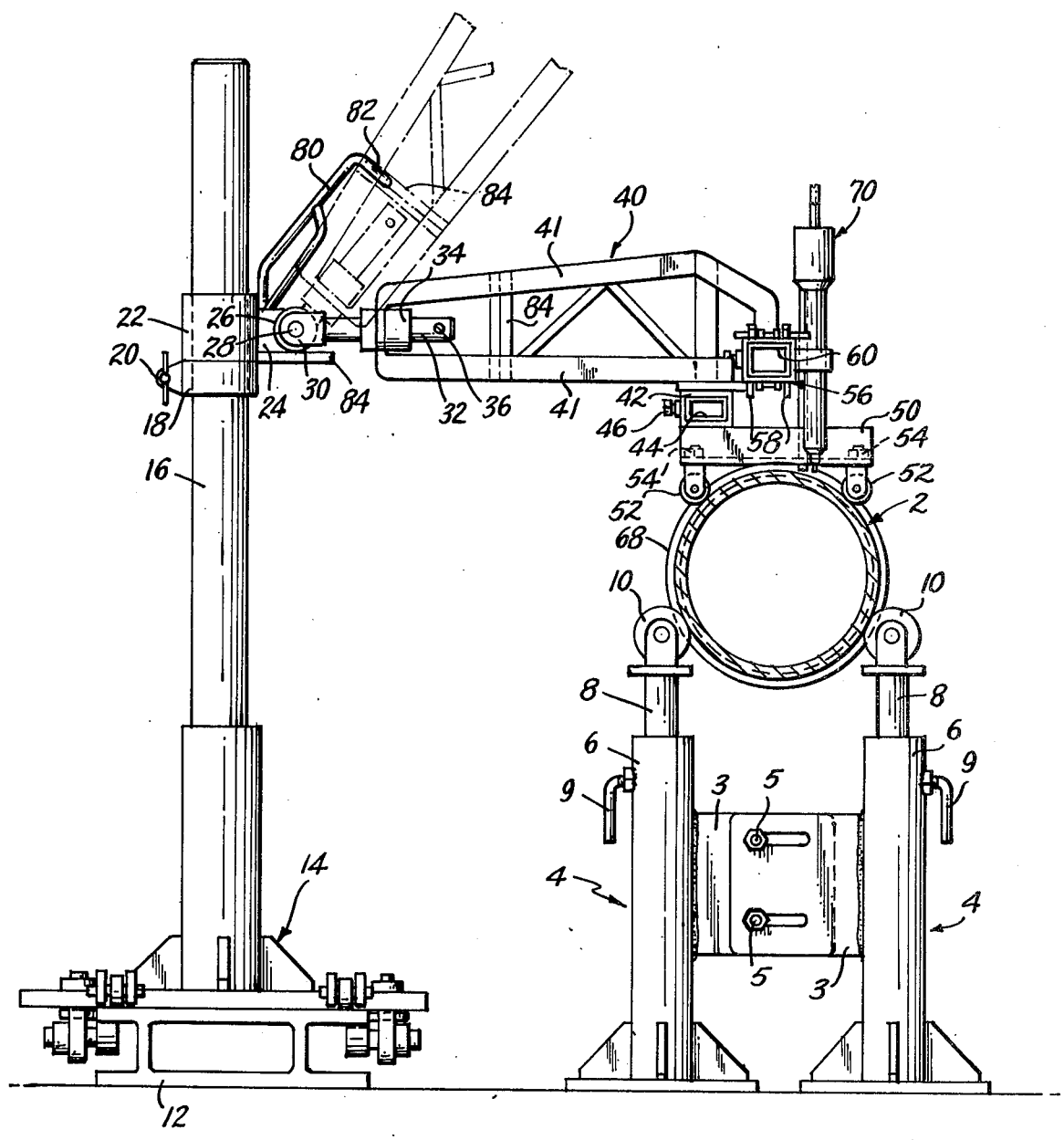
FIG. 3 is a transverse sectional view through the pipe and showing the apparatus as viewed from the left side of FIG. 1.

As further shown in FIG. 3, the sleeve 22 and bracket 24 are provided with a suitable latch member 80 having a hook end portion 82 capable of being resiliently engaged with a cross member 84 of the frame 40 when the latter is tilted upwardly about bushing 26 to the position shown in broken lines in FIG. 3. Thus, the latch 80 will hold the frame 40 and its associated mechanisms in an elevated position free of the pipe 2 when desired. This feature permits ready disengagement of the follower mechanism from the pipe and templet for replacing the pipe or for other purposes.

Also fixedly carried by the sleeve 22 and bracket 24 is a stop plate 84 extending horizontally under the bushing 26 and yoke 30 toward the outer end of frame 40 sufficiently to constitute a stop means to limit downward swinging movement of the frame 40 about the axis of stub shafts 28. Thus, the frame 40 cannot drop below a predetermined angular position even in the absence of any pipe 2 to support the same.

In addition to the feature wherein the rollers 52 may be adjusted toward and from each other to accommodate pipes of different diameters, the collar 18 may be vertically adjusted on the post 16 to ensure that the templet follower and tool can rise and fall to follow all undulations of the pipe without interference from the stop plate 84 previously described.

While a single specific embodiment of the invention has been shown and described, the same is merely illustrative of the principles involved and other forms may be constructed without departing from the scope of the invention as defined by the appended claims.

I claim:

1. In apparatus for performing cutting or welding operations on pipe and having means for supporting a length of pipe for rotation about its longitudinal axis, a control template carried by and surrounding the pipe and a pattern follower arranged to control movement of a tool relative to the pipe, the improvement comprising:

a frame having guide means guidingly supporting an elongated member for longitudinal movement parallel to and above the axis of a pipe and having a pattern follower and tool fixed thereon;

roller means on said frame arranged to rest on the upper surface of a pipe and hold said frame and elongated member a constant distance from the surface of said pipe as the latter rotates; and said frame being connected to a stationary support member by support means providing for swinging movement of said frame about three mutually perpendicular axes, a first one of which is vertical and a second one of which is substantially parallel to the axis of said pipe.

2. Apparatus as defined in claim 1 wherein said support member is positioned laterally of said pipe; said support means also providing for sliding movement of said frame relative to said support member in directions toward and from said pipe.

3. Apparatus as defined in claim 1 wherein said support member comprises an upright cylindrical post and a bearing collar vertically adjustable along said post, said support means including a sleeve around said post and resting on said collar, said sleeve being rotatable about said post and defining said first axis.

4. Apparatus as defined in claim 3 including a bushing secured to said sleeve and defining said second axis.

5. Apparatus as defined in claim 4 including a yoke journalled on said bushing and having a spindle extending generally toward said pipe, said frame being carried by said spindle for rotation therearound and for sliding movement therealong.

6. Apparatus as defined in claim 1 including stop means on said support member for limiting downward movement of said frame, about said second axis, to a generally horizontal position.

7. Apparatus as defined in claim 1 including latch means for releasably holding said frame in an elevated position of movement about said second axis.

8. Apparatus as defined in claim 1 wherein said roller means include a pair of brackets adjustable along said elongated member in a direction parallel to the axis of said pipe, each bracket having a pair of rollers thereon and means for selectively changing the distance between the rollers of each pair.

9. Apparatus as defined in claim 8 wherein said elongated member is guided by brackets selectively adjustable along an elongated bar, said bar constituting a portion of said guide means and extending parallel to said pipe and being mounted on said frame for longitudinal adjustment thereon.

* * * * *